United States Patent
Kanajan

(10) Patent No.: US 7,548,551 B2
(45) Date of Patent: Jun. 16, 2009

(54) SYSTEM AND METHOD OF OPTIMIZING THE BANDWIDTH OF A TIME TRIGGERED COMMUNICATION PROTOCOL WITH HOMOGENEOUS SLOT SIZES

(75) Inventor: Sri K. Kanajan, Warren, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 670 days.

(21) Appl. No.: 11/208,111

(22) Filed: Aug. 19, 2005

(65) Prior Publication Data

US 2007/0041396 A1 Feb. 22, 2007

(51) Int. Cl.
*H04L 12/56* (2006.01)
(52) U.S. Cl. .................................. 370/442; 370/470
(58) Field of Classification Search .......... 370/442, 370/254, 458, 468, 470
See application file for complete search history.

(56) References Cited

U.S. PATENT DOCUMENTS

| | | | | |
|---|---|---|---|---|
| 4,497,059 A | 1/1985 | Smith | | 371/36 |
| 5,694,542 A | 12/1997 | Kopetz | | 395/185.02 |
| 6,201,791 B1 | 3/2001 | Bournas | | 370/234 |
| 6,307,867 B1 * | 10/2001 | Roobol et al. | | 370/470 |
| 2004/0081193 A1 * | 4/2004 | Forest et al. | | 370/458 |
| 2006/0143345 A1 * | 6/2006 | Fredriksson | | 710/106 |
| 2007/0206603 A1 * | 9/2007 | Weich et al. | | 370/395.4 |
| 2008/0140949 A1 * | 6/2008 | Hartwich et al. | | 711/154 |

OTHER PUBLICATIONS

TZ Mikroelektronic, Flexray Introduction.*
International Search Report for PCT/US 06/28028 dated Apr. 2, 2007 corresponding to this application.

* cited by examiner

*Primary Examiner*—Derrick W Ferris
*Assistant Examiner*—Christopher R Crompton

(57) ABSTRACT

An improved communications system adapted for use in a network, and configured to optimize the static slot size for transmitting a plurality of time-triggered messages. A preferred embodiment of the system includes a removable controller configured to determine the amount of overhead bits incurred within a slot, the amount of databytes that can be transmitted within the duration of a slot, and the amount of data to be communicated, and to perform an optimization algorithm relative thereto.

9 Claims, 2 Drawing Sheets

SYSTEM AND METHOD OF OPTIMIZING THE BANDWIDTH OF A TIME TRIGGERED COMMUNICATION PROTOCOL WITH HOMOGENEOUS SLOT SIZES

BACKGROUND OF THE INVENTION

1. Technical Field

The present invention relates to internal communication systems, and more particularly to a system configured to optimize the static slot size of a time-triggered communication protocol with homogeneous slot sizes.

2. Background Art

Internal communication protocols have been developed to support the instrument panels, clusters and otherwise electrical components of transportation machines, such as automobiles, aircrafts, recreational vehicles, and boats. Conventional protocols and in-vehicle networking standards, such as Local Interconnect Networks (LIN), Media Oriented System Transport (MOST), and Controller Area Network (CAN) systems, control electrical communication between various nodes and a host controller, so as to enable inter-nodal function. In automobiles, for example, electro-mechanical power-assisted steering and anti-lock brakes typically utilize a communication network and protocol to receive electric signals from a controller, which communicates with various sensors and actuators. As functionality in transportation machines become increasingly driven by electro-mechanical and electric means, the necessary capacity, flexibility, and reliability of these protocols and network systems become increasingly critical for proper and safe operation. The introduction of advanced control systems that often combine multiple sensors, actuators and electronic control units place boundary demands on conventional communication systems.

As a result, one type of communication system, the FlexRay™ communications protocol ("FlexRay"), has been developed for increasing the bandwidth, determinism, flexibility, scalability, and fault-tolerance of automotive electronic systems. In contrast to conventional event-triggered protocols, FlexRay combines a time-triggered along with an event-triggered system. Generally, the FlexRay protocol presents a multi-channeled communications medium, wherein each channel includes static and dynamic segments during a communication cycle. In the static segment, requirements such as latency and jitter are addressed by deterministic communication timing. A plurality of time-divisible-multiple-access (TDMA) slots of homogenous duration comprises the static segment and re-occurs each cycle. The TDMA slots are manually sized prior to automation, and each slot is accordingly allocated to a node connected to the system, so that the node is able to constantly, and without collision, communicate with the network. The remaining bandwidth includes a dynamic segment divided into a plurality of mini-slots, wherein each mini-slot is configured to receive an event-triggered message of variable size, such as diagnosis data.

Once manually implemented, however, the FlexRay protocol presents a one-size-fits all application that limits bandwidth efficiency. More particularly, during multiple cycles, the static slots transmit varying sets of messages having differing numbers and sizes. For message sets smaller than the ideal set for which the slots were sized, transmission of empty or excessively large slots during a cycle wastes bandwidth, and thereby causes undue delays in the overall system, and reduces the responsiveness of the nodes. For message sets larger than the ideal set for which the slots were sized, the rigidity of the protocol results in excessive time-triggered backlog. Finally, transmission of empty or excessively large slots also reduces available event-triggered bandwidth, which may further result in event-triggered backlog or slow response.

Thus, there is currently a trade-off between having many small slots that incur large protocol overhead and having a few large slots that cause wasted bandwidth for small messages. To further effect the benefits of the FlexRay protocol, for example, there is a need in the art for an improved time-triggered system that more efficiently determines the optimal static slot size for a given set of messages.

DISCLOSURE OF INVENTION

Responsive to these and other concerns associated with conventional communications protocols and networks, the present invention concerns an improved system that is useful, among other things, for optimizing the static slot size of a bandwidth, so as to maximize the transmission efficiency of time-triggered messages.

A first aspect of the present invention concerns an internal communication system adapted for communicatively coupling a plurality of nodes. The system includes a host ECU, and a first channel interconnecting the nodes and ECU. The ECU and first channel are cooperatively configured to transmit a plurality of time-triggered messages to and from at least a portion of the nodes, wherein each message is allocated to and transmitted within one of a plurality of static slots, during at least one cycle. The ECU is further configured to determine an optimal slot size for carrying the messages. More preferably, an optimization algorithm is run off-line to calculate the optimal slot size, which is then uploaded to an existing internal communication system.

A second aspect of the invention concerns a method of communicating a plurality of M digital messages across a channel and during at least one cycle, wherein said at least one cycle presents a plurality of TDMA slots. First, for each message a start time, an end time, a number of bits that need to be transmitted, a number of slots dedicated therefor, and a number of slots necessary for transmission less than or equal to the number of slots dedicated therefor, are determined. A baud rate of communication for the channel, an amount of databytes that can be transmitted within the duration of a slot, an amount of overhead bits sent within each slot, and the maximum amount of non-overhead data that can be sent within a slot are also determined. Finally, an optimal slot size relative to the amount of overhead bits, the amount of databytes that can be transmitted within the duration of a slot, and the amount of data to be communicated is determined.

It will be understood and appreciated that the present invention provides a number of advantages over the prior art, including, for example, providing an improved communications system that autonomously optimizes the TDMA slot size for transmitting a set of messages. As a result, excessive backlog and bandwidth waste are minimized; making the invention better suited to handle traffic in increasingly complex electrical networks. The present invention also reduces the man-hours and expertise required for manually setting slot size parameters, the likelihood of human error in setting an arrant slot size, and the affects thereof.

Other aspects and advantages of the present invention will be apparent from the following detailed description of the preferred embodiment(s) and the accompanying drawing figures.

BRIEF DESCRIPTION OF DRAWINGS

A preferred embodiment(s) of the invention is described in detail below with reference to the attached drawing figures, wherein.

MODES FOR CARRYING OUT THE INVENTION

Figure 1:
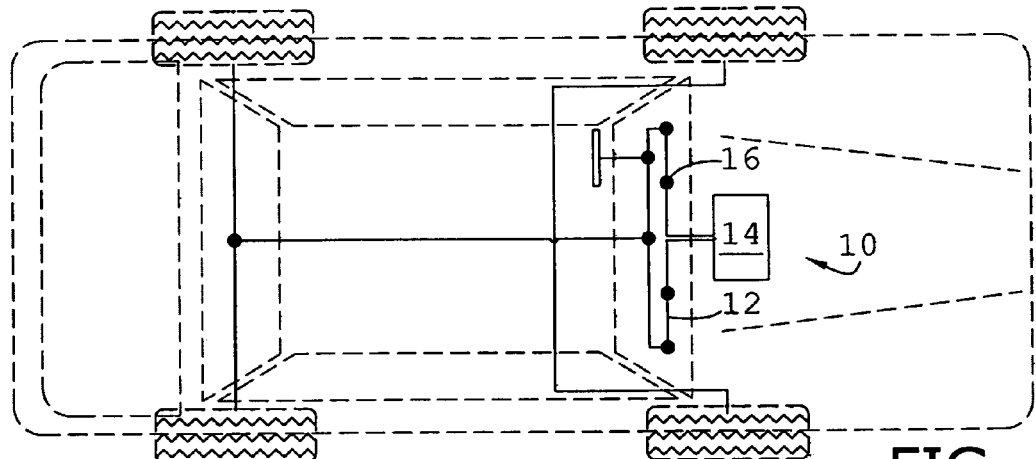
FIG. 1 is a schematic view of a preferred embodiment of the system adapted for use in a vehicle.

The present invention concerns an improved communications system that optimizes the static slot size of a communication cycle. A preferred embodiment of the system 10 is shown in FIG. 1, and described herein with respect to a FlexRay protocol and communications network. However, it is appreciated that the novel aspects and function of the present invention can be utilized with any time-triggered communications scheduler that utilizes a plurality of static slots. It is further appreciated that the method and algorithms described herein present a preferred embodiment of the invention, and that modifications within the ambit of the invention can be made to modify system performance. For example, one of a plurality of inputted variables and/or constants could be added to the algorithm described herein, to provide added safety or accommodate user-preference. As illustrated in FIG. 1, the system 10 includes a single bus 12, however, it is also within the ambit of the invention to utilize the invention with a FlexRay system having a twisted pair, multi-bus, star or other configuration.

The preferred system 10 further includes a host electronic control unit (ECU) 14, and a plurality of nodes 16 that represent various electro-mechanical components of a network. For example, in an automobile, the nodes 16 may represent a GPS and map system, a steer-by-wire system, a brake-by-wire system, a fully functional entertainment system, and an instrument cluster, each having its own ECU. The physical transport layer may be electrical, optical, or a combination of both domains, with the understanding that message conversion is necessary before delivering to an optical medium.

Figure 2A:
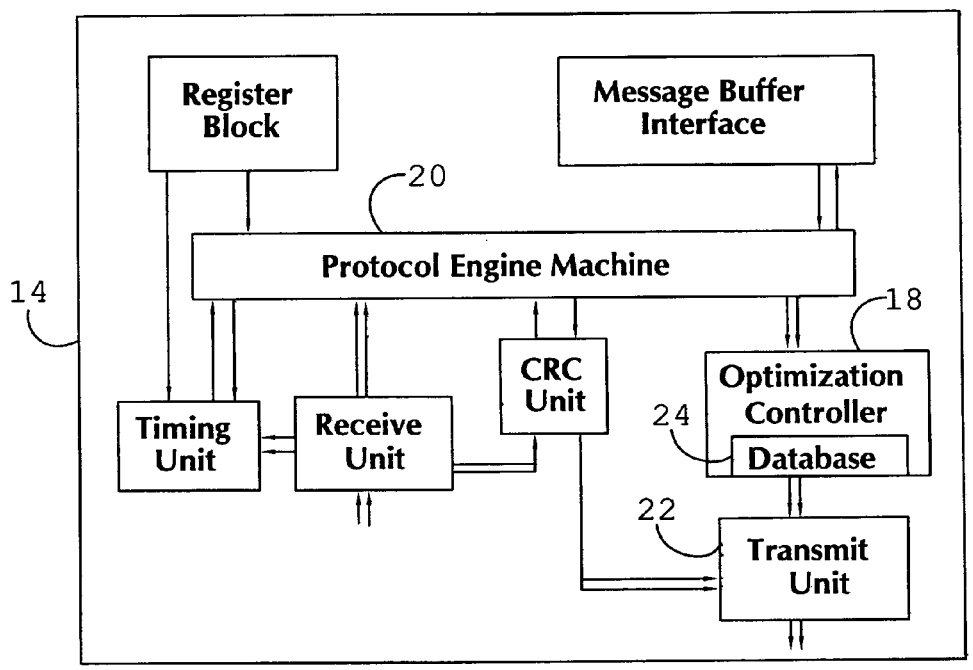
FIG. 2a is a block diagram of an ECU in accordance with a preferred embodiment of the invention.

As shown in FIG. 2a, the ECU 14 includes novel optimization means, and more preferably includes a separate optimization controller 18 communicatively coupled to a protocol engine machine 20. Most preferably, the optimization controller 18 is removably connected to the ECU 14, and configured so as to be able to retrofit an existing communication system. For example, a portable device (not shown), such as a laptop computer, may present the controller 18, and be configured to removably connect to an existing system, to provide a one-time off-line determination of the optimal slot size. The optimization controller 18 may be wirelessly connected to the ECU 14 and presented by a third-party service located at a remote location. It is appreciated by those ordinarily skilled in the art that determining the optimal slot size off-line facilitates internal clock synchronization among nodes. Alternatively, where hard-wire communication is utilized, and a more integrated method of continually determining the optimal slot size is desired, the preferred controller 18 may include male prongs or female receptacles (also not shown) that securely connect to the ECU 14. As used herein, references made to the ECU 14 inclusion of the optimization controller 18, shall encompass permanent, removable, and wirelessly communicating connections, and off-line or integrated configurations.

Figure 2B:
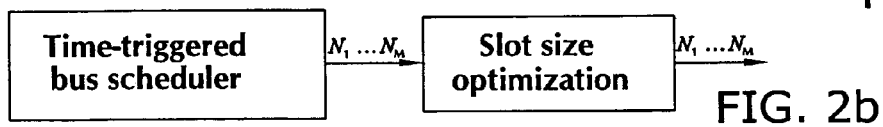
FIG. 2b is a flow diagram of the present invention, particularly illustrating an optimization controller.

As shown in FIGS. 2a and 2b, the controller 18 is configured to receive a plurality of M messages from the protocol engine machine 20, and after optimizing the slot size, deliver the messages to a transmit unit 22. Where removable connectivity is desired, however, the controller 18 is further configured to set the optimal slot size within the system 10, so as to enable optimal communication between the machine 20 and transmit unit 22. The preferred ECU 14 also includes a bus guardian configured to verify the authenticity and propriety of the messages prior to optimization.

Figure 3:
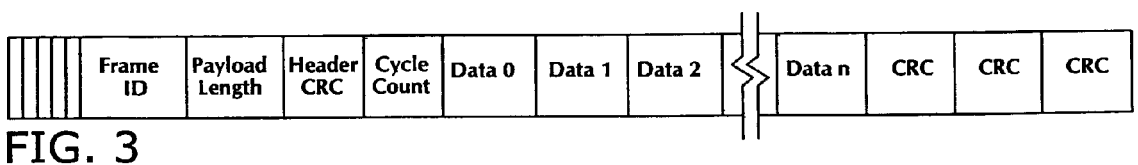
FIG. 3 is a block diagram of a FlexRay frame format.

Within a FlexRay protocol system, messages are received from and delivered to the slots in the frame format shown in FIG. 3. A header segment of a typical frame includes various indicators and subframes, including a "Frame ID" subframe that presents 5 Bytes of overhead data. The Frame ID is utilized to numerically sort and match the frame with an allocated slot. A payload segment follows the header segment, and presents the actual message data. The payload segment may range in size from 0 to 254 Bytes depending upon the message. Finally, a trailer segment, containing three 8-bit cyclic redundancy checks (CRCs), primarily functions to detect errors. Thus, in the illustrated embodiment, the total frame size can range from 8 to 262 Bytes.

Figure 4A:
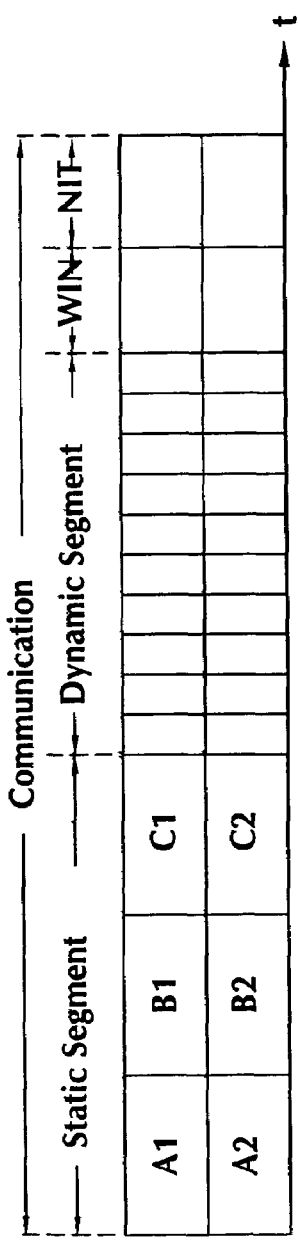
FIG. 4a is a block diagram of a communication cycle, particularly illustrating a unison multi-channel cycle.
Figure 4B:
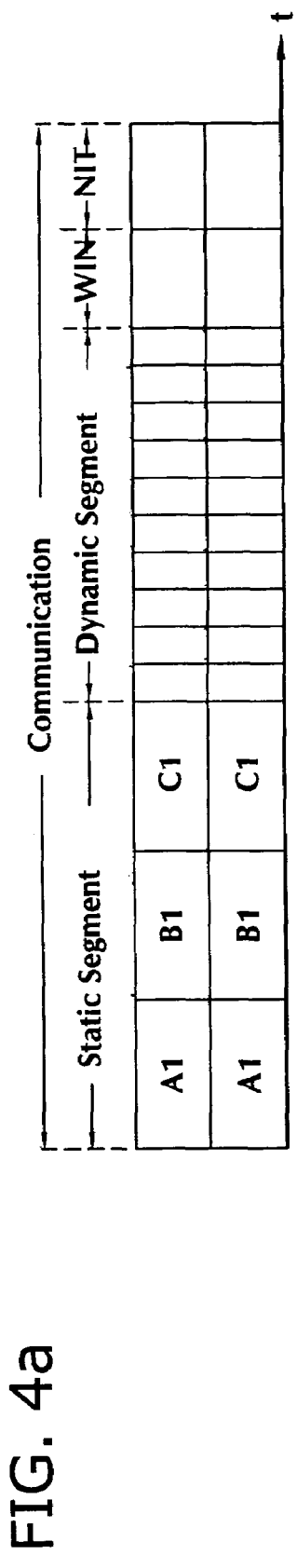
FIG. 4b is a block diagram of a communication cycle, particularly illustrating a combined redundant multi-channel cycle.
Figure 4C:
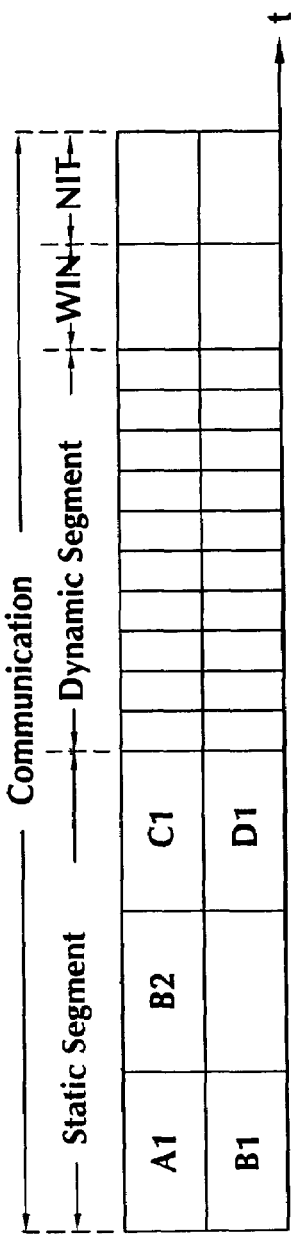
FIG. 4c is a block diagram of a communication cycle, particularly illustrating a mixed connectivity multi-channel cycle.

In FIGS. 4a-c, three multi-channeled communication cycles are shown over a given time period. Each multi-channel system presents temporally congruent slots and reflects one of three modes of communication. First, the channels may act in unison to form a single-channel system, wherein the data throughput is effectively multiplied by the number of channels per slot (see, FIG. 4a). The channels may also act as a combined multi-channel system, wherein nodes connected to each channel can be configured to transmit data redundantly on each channel at the same time (see, FIG. 4b). Finally, the system 10 may reflect a multi-channel system with mixed connectivity, wherein some nodes connect to each channel, and some connect only to one (see, FIG. 4c).

As previously mentioned, a static segment begins each cycle and presents a plurality of static slots. The static segment is followed by a dynamic segment, a symbol window that presents an un-arbitrated single-message slot for application use, and network idle time that allows computing time corrections and nodal housekeeping. More preferably, a plurality of static slots at least equal to the greatest number of potentially communicating nodes, and most preferably, a variable plurality of slots is presented, so as to enable numerical optimization by the controller 18. In the later instance, the number of slots is preferably set at the number of currently active nodes in the network. Thus, since the optimization controller 18 is also configured to optimize the size of the slots, both the optimal number and size of the slots are determined. However, to ensure sufficient bandwidth for transmitting event-triggered messages, the controller 18 is more preferably configured to impose upper limitations upon the size of the static segment.

In a preferred embodiment of the invention, the system 10 is configured to determine the optimal slot size relative to various parameters and performance characteristics of the messages and FlexRay network. More preferably, for each message, the machine 20 and/or controller 18 are configured to determine a start time ($S_{start}$), end time ($S_{end}$), size ($N_i$), number of slots dedicated for the transmission ($N_{segment\_size}$), and number of slots necessary for transmission ($N_{data\_slots}$). From the network, a baud rate of communication (B, typically [10 MBit/s]), an amount of databytes that can be transmitted within the duration of a slot ($N_{data}$, taking into consideration the number of channels), an amount of Overhead bits sent within each slot ($N_{overhead}$, based on frame format, i.e. message header and trailer, and encoding approach), and a maximum amount of non-overhead data that can be sent within the slot ($N_{slot\_data}$) are determined. Where differing message sizes fill concurrent slots (as shown in FIGS. 4a and 4c), the controller 18 is further configured to determine the larger of the two concurrently scheduled messages, and to use the larger size in determining the optimal slot size.

More particularly, these parameters and characteristics cooperatively yield the following constraints:

$$N_{segment\_size} \langle N_{data\_slots} \quad (1)$$

$$N_{segment\_size} = \frac{S_{end} - S_{start}}{T_{seg}}, \text{ Where } T_{seg} = \frac{(N_{Overhead} + N_{slot\_data})}{B} \quad (2)$$

$$N_{data\_slots} = (N_{Overhead} + N_{data}) * \left(\text{ceil}\left(\frac{N_i}{N_{data}}\right)\right) \quad (3)$$

$$CC \bmod(T_{seg}) = 0 \quad (4)$$

$$\sum_{M_i \in Src_m, Dest_m} \text{ceil}\left(\frac{N_i}{N_{data}}\right) \le Buff_m \quad (5)$$

Relationship (1) provides that the number of necessary slots is less than or equal to the number of slots dedicated therefor. Equations (2) establish an integer value for $N_{segment\_size}$ equal to the difference between message arrival time and deadline, divided by the a time variable, $T_{seg}$, wherein $T_{seg}$ equals the total amount of bits that can be sent in a slot divided by the baud rate. Equation (3) provides that the number of slots necessary for transmission is equal to the product of the sum of the amount of data bytes that can be transmitted within the duration of a slot, $N_{data}$, and the amount of overhead bits sent within each slot; and an upper integer value of the message size divided by $N_{data}$. Equation (4) provides that the number of slots in a cycle must be an integer, where CC is the duration of the static segment. Finally, relationship (5) provides that the upper integer value must not be greater than the number of messages that can be stored in the ECU 14.

Given these constraints, the preferred controller 18 is configured to determine the optimal static slot size as a function of the message size, the overhead bits incurred within the allocated slot, and the amount of data bits that can be transmitted within the duration of the slot. More preferably, the optimal slot size is determined according to the following algorithm:

$$\max \sum_{i=1}^{M} \frac{N_i}{(N_{Overhead} + N_{data}) * \left(\text{ceil}\left(\frac{N_i}{N_{data}}\right)\right)} \quad (6)$$

wherein for each message 1 through M, the message size is divided by the number of slots necessary for transmission (see, equation (3)). The summation of quotients obtained provides the optimal slot size. A non-linear optimization technique, such as simulated annealing, is preferably used to determine the optimal slot size.

The preferred controller 18 is further configured to cause the storage of the optimal slot size result for a given set of messages for at least a minimum period, and more preferably, includes permanent storage and memory capabilities. In this configuration, each set of messages received from the protocol engine machine 20 is first compared with previously performed sets to determine if a previously determined optimal slot size exists. Thus, the system 10 more preferably includes an interrelational database 24, processor (not shown), and query performing program code (also not shown) cooperatively configured to accomplish this task.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventor hereby state his intent to rely on the Doctrine of Equivalents to determine and assess the reasonably fair scope of the present invention as pertains to any system not materially departing from but outside the literal scope of the invention as set forth in the following claims.

What is claimed is:

1. An optimization controller adapted for use with an existing internal communication system, and configured to receive a plurality of M time-triggered messages from, and determine an optimal slot size for transmitting the messages to the system, wherein the optimal slot size is autonomously determined as a function of the size of each message, the overhead bits incurred within the slot, and the amount of data bits that can be transmitted within the duration of the slot, and in accordance with the following algorithm:

$$\max \sum_{i=1}^{M} \frac{N_i}{(N_{Overhead} + N_{data}) * \left(\text{ceil}\left(\frac{N_i}{N_{data}}\right)\right)}$$

where $N_i$, is the size of message i,
$N_{Overhead}$ is the overhead bits incurred within a time slot, and
$N_{data}$ is the amount of databits that can be transmitted within the duration of a slot.

2. he controller as claimed in claim 1, wherein said optimal slot size is limited by a maximum value.

3. The controller as claimed in claim 1, including memory and storage means, wherein a database of previously determined optimal slot sizes and corresponding sets of message sizes are stored and accessible by the system.

4. A method of communicating a plurality of M messages across a channel and during a cycle, wherein said cycle presents a plurality of TDMA slots, said method comprising the steps of:

a. determining for each message a start time, end time, a number of bits that need to be transmitted, a number of slots dedicated therefor, and a number of slots necessary for transmission, wherein the later is less than or equal to the number of slots dedicated therefor, and determining the number of slots dedicated for the transmission of the message, $N_{segment\_size}$, according to the following equation:

$$N_{segment\_size} = \frac{S_{end} - S_{start}}{T_{seg}}, \text{ Where } T_{seg} = \frac{(N_{Overhead} + N_{slot\_data})}{B}$$

where $S_{end}$ is the end time,
$S_{start}$ is the start time,
$N_{Overhead}$ is the amount of overhead bits that are incurred, and
$N_{slot\_data}$ is the maximum amount of non-overhead data that can be sent within a slot;

b. determining a baud rate of communication for the channel, an amount of databytes that can be transmitted within the duration of a slot, an amount of overhead bits sent within each slot, and the maximum amount of non-overhead data that can be sent within a slot; and c. determining an optimal slot size relative to the amount of overhead bits, the amount of databytes that can be transmitted within the duration of a slot, and the amount of data to be communicated.

5. The method as claimed in claim 4, wherein step c) further includes the steps of using a non-linear optimization technique to determine the optimal slot size.

6. The method as claimed in claim 5, wherein step c) further includes the steps of using simulated annealing to determine the optimal slot size.

7. The method as claimed in claim 4, wherein step a) further includes the steps of determining the number of slots that is necessary for the transmission of the data, $N_{data\_slots}$, according to the following equation:

$$N_{data\_slots} = (N_{Overhead} + N_{data}) * \left(\text{ceil}\left(\frac{N_i}{N_{data}}\right)\right).$$

where $N_i$, is the size of message i,
$N_{Overhead}$ is the amount of overhead bits that are incurred, and
$N_{slot\_data}$ is the maximum amount of non-overhead data that can be sent within a slot.

8. The method as claimed in claim 4,
step a) further including the steps of securing an ECU relative to the channel, said ECU being configured to store a plurality of messages not less than M.

9. A method of communicating a plurality of M messages across a channel and during a cycle, wherein said cycle presents a plurality of TDMA slots, said method comprising the steps of:

a. determining for each message a start time, end time, a number of bits that need to be transmitted, a number of slots dedicated therefor, and a number of slots necessary for transmission, wherein the later is less than or equal to the number of slots dedicated therefor;

b. determining a baud rate of communication for the channel, an amount of databytes that can be transmitted within the duration of a slot, an amount of overhead bits sent within each slot, and the maximum amount of non-overhead data that can be sent within a slot; and c. determining an optimal slot size relative to the amount of overhead bits, the amount of databytes that can be transmitted within the duration of a slot, and the amount of data to be communicated, and determining the optimal slot size according to the following algorithm:

$$\max \sum_{i=1}^{M} \frac{N_i}{(N_{Overhead} + N_{data}) * \left(\text{ceil}\left(\frac{N_i}{N_{data}}\right)\right)}$$

Where $N_i$, is the size of message i,
$N_{Overhead}$ is the amount of overhead bites transmitted in each slot, and
$N_{data}$ is the amount of databytes that can be transmitted within the duration of a slot.

* * * * *